US010866711B1

(12) United States Patent
Campbell et al.

(10) Patent No.: US 10,866,711 B1
(45) Date of Patent: Dec. 15, 2020

(54) PROVIDING ACCOUNT INFORMATION TO APPLICATIONS

(71) Applicant: Amazon Technologies, Inc., Reno, NV (US)

(72) Inventors: Brad Lee Campbell, Seattle, WA (US); Daniel Wade Hitchcock, Bothell, WA (US); Joshua Lee Davis, Ames, IA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 339 days.

(21) Appl. No.: 14/107,150

(22) Filed: Dec. 16, 2013

(51) Int. Cl.
*G06F 3/0484* (2013.01)

(52) U.S. Cl.
CPC ................ *G06F 3/04842* (2013.01)

(58) Field of Classification Search
CPC ............ G06F 17/243; G06F 3/04842
See application file for complete search history.

(56) References Cited

U.S. PATENT DOCUMENTS

| | | | |
|---|---|---|---|
| 5,835,722 A | 11/1998 | Bradshaw et al. | |
| 5,880,523 A | 3/1999 | Candelore | |
| 6,233,339 B1 | 5/2001 | Kawano et al. | |
| 8,745,705 B2 | 6/2014 | Hitchcock et al. | |
| 8,769,643 B1 | 7/2014 | Ben Ayed | |
| 8,776,194 B2 | 7/2014 | Hitchcock et al. | |
| 8,819,795 B2 | 8/2014 | Hitchcock et al. | |
| 8,832,807 B1 | 9/2014 | Kuo et al. | |
| 8,850,010 B1 | 9/2014 | Qureshi | |
| 8,863,250 B2 | 10/2014 | Hitchcock et al. | |
| 8,955,065 B2 | 2/2015 | Hitchcock et al. | |
| 9,055,055 B1 | 6/2015 | Strand et al. | |
| 9,237,305 B2 | 1/2016 | Guzman et al. | |
| 9,294,476 B1 | 3/2016 | Lurey et al. | |
| 2004/0172472 A1* | 9/2004 | Jackel | H04L 45/02 709/225 |
| 2005/0177731 A1* | 8/2005 | Torres | H04L 67/02 713/182 |
| 2006/0083228 A1 | 4/2006 | Ong et al. | |
| 2007/0113294 A1 | 5/2007 | Field et al. | |

(Continued)

FOREIGN PATENT DOCUMENTS

| | | |
|---|---|---|
| WO | 2012173681 | 12/2012 |
| WO | 2013081508 | 6/2013 |

OTHER PUBLICATIONS

U.S. Patent Application entitled "Account Management for Multiple Network Sites" filed Feb. 1, 2012, having U.S. Appl. No. 13/363,654.

(Continued)

*Primary Examiner* — Sherrod L Keaton
(74) *Attorney, Agent, or Firm* — Thomas | Horstemeyer, LLP

(57) ABSTRACT

Disclosed are various embodiments that provide account information, such as usernames and passwords, to applications. Respective account information is stored for multiple accounts. A user interface is rendered that facilitates a user selection of a particular application from multiple applications. A particular account is identified in response to the user selection. One or more operations are initiated to create a runtime association between an instance of the particular application and the account information corresponding to the particular account.

20 Claims, 12 Drawing Sheets

(56) References Cited

U.S. PATENT DOCUMENTS

| | | |
|---|---|---|
| 2007/0186106 A1 | 8/2007 | Ting et al. |
| 2008/0028447 A1 | 1/2008 | O'Malley et al. |
| 2008/0307236 A1* | 12/2008 | Lu .................. H04L 9/3226 713/184 |
| 2009/0146267 A1 | 6/2009 | Peytavy et al. |
| 2009/0249247 A1* | 10/2009 | Tseng ............ H04M 1/72544 715/808 |
| 2009/0300097 A1* | 12/2009 | Meyer ............ G06F 40/174 709/203 |
| 2011/0061016 A1* | 3/2011 | Song .................. H04L 67/24 715/779 |
| 2011/0143711 A1 | 6/2011 | Hirson et al. |
| 2011/0219230 A1 | 9/2011 | Oberheide et al. |
| 2011/0265172 A1 | 10/2011 | Sharma et al. |
| 2011/0265173 A1* | 10/2011 | Naaman ............ G06F 21/41 726/8 |
| 2012/0198228 A1 | 8/2012 | Oberheide et al. |
| 2012/0198535 A1 | 8/2012 | Oberheide et al. |
| 2013/0024925 A1 | 1/2013 | Venkataramani |
| 2013/0055372 A1 | 2/2013 | Chao et al. |
| 2013/0091544 A1 | 4/2013 | Oberheide et al. |
| 2013/0198818 A1 | 8/2013 | Hitchcock et al. |
| 2013/0198821 A1 | 8/2013 | Hitchcock et al. |
| 2013/0198823 A1 | 8/2013 | Hitchcock et al. |
| 2013/0198824 A1 | 8/2013 | Hitchcock et al. |
| 2013/0212387 A1 | 8/2013 | Oberheide et al. |
| 2013/0262857 A1 | 10/2013 | Neuman et al. |
| 2013/0312078 A1 | 11/2013 | Oberheide et al. |
| 2014/0040628 A1 | 2/2014 | Fort et al. |
| 2014/0101734 A1 | 4/2014 | Ronda et al. |
| 2014/0157381 A1 | 6/2014 | Disraeli |
| 2014/0189808 A1* | 7/2014 | Mahaffey ........ H04L 63/0853 726/4 |
| 2014/0223175 A1 | 8/2014 | Bhatnagar |
| 2014/0245379 A1 | 8/2014 | Oberheide et al. |
| 2014/0245389 A1 | 8/2014 | Oberheide et al. |
| 2014/0245396 A1 | 8/2014 | Oberheide et al. |
| 2014/0245450 A1 | 8/2014 | Oberheide et al. |
| 2014/0250517 A1 | 9/2014 | Kim et al. |
| 2014/0259028 A1 | 9/2014 | Atwood et al. |
| 2014/0259130 A1 | 9/2014 | Li et al. |
| 2014/0344907 A1* | 11/2014 | Wan .................. H04L 63/083 726/6 |
| 2015/0039803 A1 | 2/2015 | Yamamoto |
| 2015/0040190 A1 | 2/2015 | Oberheide et al. |
| 2015/0046989 A1 | 2/2015 | Oberheide et al. |
| 2015/0046990 A1 | 2/2015 | Oberheide et al. |
| 2015/0067830 A1 | 3/2015 | Johansson et al. |
| 2015/0074408 A1 | 3/2015 | Oberheide et al. |
| 2015/0074644 A1 | 3/2015 | Oberheide et al. |
| 2015/0134956 A1 | 5/2015 | Stachura et al. |
| 2015/0312250 A1 | 10/2015 | Redberg et al. |
| 2016/0197914 A1 | 7/2016 | Oberheide et al. |

OTHER PUBLICATIONS

U.S. Patent Application entitled "Authentication Management Services" filed Feb. 1, 2012, having U.S. Appl. No. 13/363,664.

U.S. Patent Application entitled "Presenting Managed Security Credentials to Network Sites" filed Feb. 1, 2012, having U.S. Appl. No. 13/363,675.

U.S. Patent Application entitled "Recovery of Managed Security Credentials" filed Feb. 1, 2012, having U.S. Appl. No. 13/363,681.

U.S. Patent Application entitled "Logout From Multiple Network Sites" filed Feb. 1, 2012, having U.S. Appl. No. 13/363,685.

U.S. Appl. No. 13/771,373, entitled "Information Manager," and filed Feb. 20, 2013.

U.S. Appl. No. 13/792,678, entitled "Proxy Server-Based Network Site Account Management," and filed Mar. 11, 2013.

U.S. Appl. No. 14/093,143, entitled "Updating Account Data for Multiple Account Providers," and filed Nov. 29, 2013.

U.S. Appl. No. 14/012,520, entitled "Dynamic Application Security Verification," and filed Aug. 28, 2013.

U.S. Appl. No. 13/679,254, entitled "Mapping Stored Client Data to Requested Data Using Metadata," and filed Nov. 16, 2012.

Google Authenticator, From Wikipedia, the free encyclopedia, 7 pages, retrieved on Jun. 23, 2015, https:l/en.wikipedia.org/wiki/Google_Authenticator.

Guide to Two-Factor Authentication, Duo Security, 3 pages, retrieved on Jun. 23, 2015, https:l/guide.duosecurity.com/.

International Search Report for PCT/US2016/043964 dated Oct. 25, 2016.

U.S. Appl. No. 62/100,203, filed Jan. 6, 2015 (21 pages).

U.S. Appl. No. 14/572,739, filed Dec. 16, 2014, Notice of Allowance dated Jun. 15, 2016.

U.S. Appl. No. 14/572,739, filed Dec. 16, 2014, Response to Non-Final Office Action dated Feb. 12, 2016.

U.S. Appl. No. 14/572,739, filed Dec. 16, 2014, Non-Final Office Action dated Feb. 12, 2016.

U.S. Appl. No. 14/809,757, filed Jul. 27, 2015, Non-Final Office Action dated Dec. 1, 2016.

U.S. Appl. No. 14/809,762, filed Jul. 27, 2015, Response to Non-Final Office Action dated Oct. 24, 2016.

U.S. Appl. No. 14/809,762, filed Jul. 27, 2015, Non-Final Office Action dated Oct. 24, 2016.

U.S. Appl. No. 14/809,757, filed Jul. 27, 2015, Final Office Action dated Mar. 30, 2017.

U.S. Appl. No. 14/809,757, filed Jul. 27, 2015, Response to Non-Final Office Action dated Dec. 1, 2016.

* cited by examiner

PROVIDING ACCOUNT INFORMATION TO APPLICATIONS

BACKGROUND

Many applications require users to sign in with a username and password so that the users may be securely identified. Users, however, often forget their username and/or password that are required to sign in. It is also common for users to use the same username and/or password for multiple applications. Managing tens or even hundreds of usernames and passwords is a major irritation for users and results in excessive abandonment rates where users simply fail to sign up for a new service if it requires a new account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing account information to applications, such as mobile applications. Manually entering usernames, passwords, and other sign-in information when an application requests them can be cumbersome. One approach to sign-in management may involve a separate application that maintains a database of usernames, passwords, and so on. For example, a user may be able to copy a stored username from the database and paste it into a form field in an application user interface. Such an approach may be unwieldy when dealing with multiple fields of information, and the approach may involve repeated switching between applications. Another approach may involve equipping the application to manage account information, such as with a browser application. That approach, however, does not manage sign-in information across multiple applications.

Various embodiments of the present disclosure facilitate management of sign-in information and other account information across multiple applications, with a simple sign-in experience that is integrated with normal application usage. In one example, an application launcher may automatically configure an instance of a selected application to use particular account information upon launching. In another example, a feature of the operating system, such as a status bar, may be configured with components that, when selected, transfer particular account information to the currently executing application. A single information manager in either example may facilitate management of account information for multiple different applications and for multiple different accounts. In some scenarios, some account information may be shared among multiple accounts and/or multiple applications.

Figure 1:
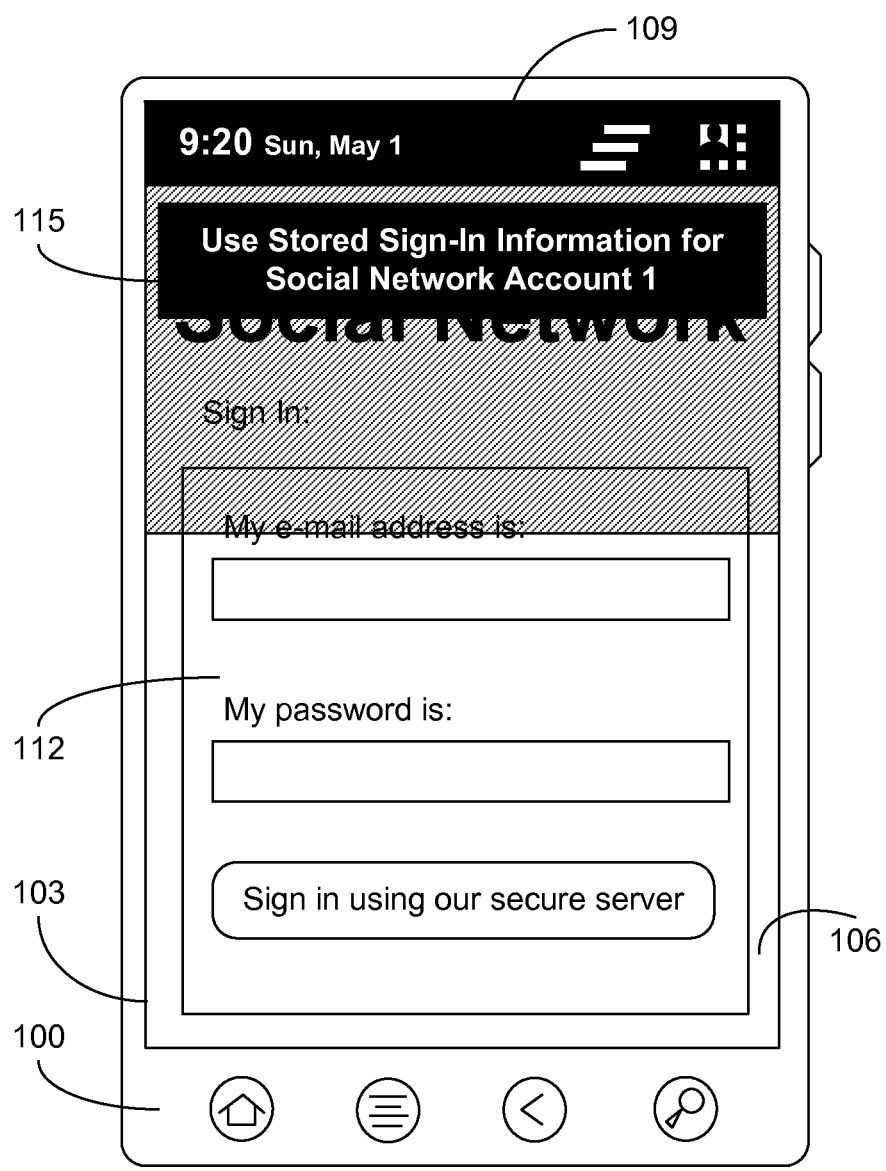
FIG. 1 is a pictorial diagram of an example user interface rendered by a client according to various embodiments of the present disclosure.

Referring to FIG. 1, shown is an example mobile device 100 that facilitates entry of sign-in information in accordance with various embodiments of the present disclosure. The mobile device 100 includes a touchscreen display 103. Rendered upon the touchscreen display 103 are an application user interface 106 and a status bar user interface 109. The application user interface 106 corresponds to the currently executing application that is given focus in the mobile device 100. In this example, the application user interface 106 corresponds to a social networking application ("Social Network") and includes a sign-in form 112 that requests an email address and a password. A user has selected the status bar user interface 109 to be expanded. Within the expanded status bar user interface 109 is a component 115 that, when selected, enables stored sign-in information for "Social Network Account 1" to be entered into the sign-in form 112. Where multiple accounts are associated with the particular application or sign-in form, the user may select from among the multiple accounts using respective components 115 in the status bar user interface 109. Although the example of FIG. 1 pertains to use of a status bar, an application launcher may also be used as an approach to provide account information to applications, as will be described. As used herein, the term "account information" is not intended to be limiting. For example, an "account" may correspond to any arbitrary grouping of information (e.g., sign-in information, payment information, contact information, etc.) that may be used in interacting with one or more account provider systems. In the following discussion, a general description of the system and its components is provided, followed by a discussion of the operation of the same.

Figure 2:
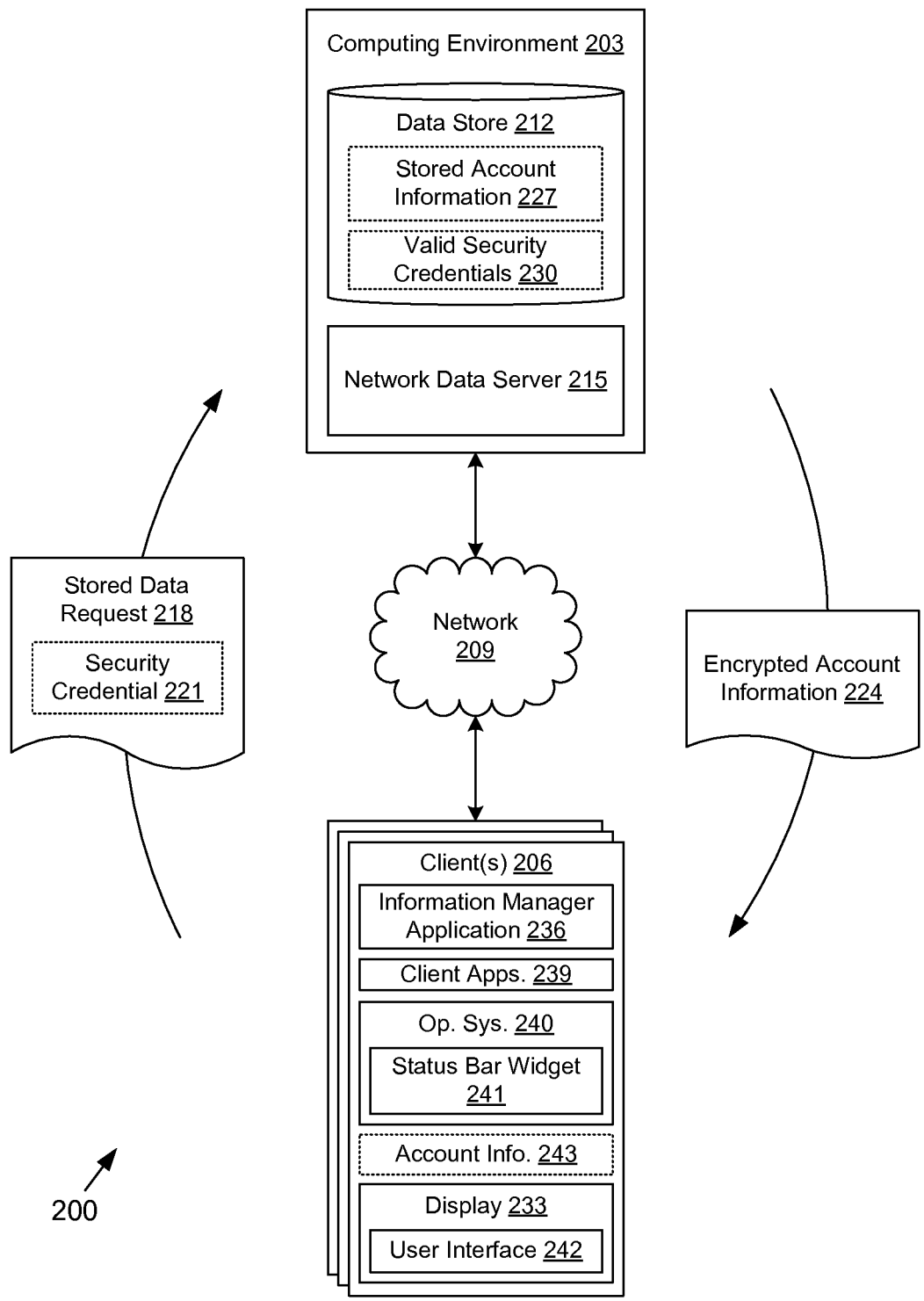
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, cable networks, satellite networks, or other suitable networks, or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a network data server 215 and other applications, services, processes, systems, engines, or functionality not discussed in detail herein. The network data server 215 is executed to obtain stored data requests 218 presenting security credentials 221 and, in response, to serve up encrypted account information 224 via the network 209. The network data server 215 may employ protocols such as hypertext transfer protocol (HTTP), simple object access protocol (SOAP), representational state transfer (REST), and/or other protocols. In one embodiment, the network data server 215 may comprise a commercially available HTTP server such as, for example, Apache® HTTP Server, Apache® Tomcat®, Microsoft® Internet Information Services (IIS), and others.

The data stored in the data store 212 includes, for example, stored account information 227, valid security credentials 230, and potentially other data. The stored account information 227 may include various information about user accounts. Such information may include, for example, sign-in information, usernames, passwords, real names, network site names and domain names, uniform resource locators (URLs), payment instrument information (e.g., credit card numbers and associated information, checking account information, and so on), identification numbers, security keys, birthdates, answers to knowledge-based security questions, names of pets, birthplaces, and/or other information. The valid security credentials 230 correspond to valid master usernames, passwords, keys, etc. for users having information stored in the stored account information 227. The valid security credentials 230 are employed to control access to the information stored in the stored account information 227.

The stored account information 227 may be created, managed, and used by various embodiments as described in U.S. Patent Application entitled "ACCOUNT MANAGEMENT FOR MULTIPLE NETWORK SITES" filed on Feb. 1, 2012, having application Ser. No. 13/363,654, U.S. Patent Application entitled "AUTHENTICATION MANAGEMENT SERVICES" filed on Feb. 1, 2012, having application Ser. No. 13/363,664, U.S. Patent Application entitled "PRESENTING MANAGED SECURITY CREDENTIALS TO NETWORK SITES" filed on Feb. 1, 2012, having application Ser. No. 13/363,675, U.S. Patent Application entitled "RECOVERY OF MANAGED SECURITY CREDENTIALS" filed on Feb. 1, 2012, having application Ser. No. 13/363,681, and U.S. Patent Application entitled "LOGOUT FROM MULTIPLE NETWORK SITES" filed on Feb. 1, 2012, having application Ser. No. 13/363,685, which are incorporated herein by reference in their entirety.

The client 206 is representative of a plurality of client devices that may be coupled to the network 209. The client 206 may comprise, for example, a processor-based system such as a computer system. Such a computer system may be embodied in the form of desktop computers, laptop computers, kiosks, personal digital assistants, cellular telephones, smartphones, set-top boxes, music players, web pads, tablet computer systems, game consoles, electronic book readers, point of sale (POS) terminals, credit card terminals, or other devices with like capability. The client 206 may include a display 233. The display 233 may comprise, for example, one or more devices such as touchscreens, liquid crystal display (LCD) displays, gas plasma-based flat panel displays, organic light emitting diode (OLED) displays, electrophoretic ink (E ink) displays, LCD projectors, or other types of display devices.

The client 206 may be configured to execute various applications and systems such as an information manager application 236, client applications 239, an operating system 240, a status bar widget 241, and/or other applications. In one instance, the information manager application 236 is executed to render a user interface 242 on the display 233 that presents various account information 243 and facilitates user selection of the account information 243 so that one or more management actions may be performed upon the selected account information 243. To this end, the information manager application 236 is configured to send the stored data request 218 to the network data server 215 and to retrieve the encrypted account information 224 from the network data server 215. The information manager application 236 decrypts the encrypted account information 224 to produce the account information 243.

Functionality of the information manager application 236 may include that described in U.S. patent application Ser. No. 13/771,373, entitled "INFORMATION MANAGER," and filed on Feb. 20, 2013; U.S. patent application Ser. No. 13/792,678, entitled "PROXY SERVER-BASED NETWORK SITE ACCOUNT MANAGEMENT," and filed on Mar. 11, 2013; and U.S. patent application Ser. No. 14/093,143, entitled "UPDATING ACCOUNT DATA FOR MULTIPLE ACCOUNT PROVIDERS," and filed on Nov. 29, 2013, all of which are incorporated by reference herein in their entireties.

The client applications 239 may be executed in a client 206, for example, to access network content served up by the computing environment 203 and/or other servers, thereby rendering a user interface 242 on the display 233. Each client application 239 may, for example, correspond to a browser, a mobile application, a shopping application, a banking application, a music playing application, a video application, a gaming application, a social application, and/or other applications that may request information from users to operate from time to time. The client applications 239 may correspond to native applications, web applications, hybrid applications, or other applications.

In various embodiments, the information manager application 236 may include, or may be integrated with, an application launcher, such that launching a client application 239 via the application launcher will cause the information manager application 236 to provide corresponding account information 243, such as sign-in information, to the launched instance of the client application 239. In other embodiments, the information manager application 236 may be integrated with the operating system 240 such that account information 243 is made available as users execute the various client applications 239. For example, the operating system 240 may include a status bar widget 241, such as that found on the Android® platform. The status bar widget 241 may be accessible via the display 233 while a user interface 242 of a client application 239 is being rendered upon the display 233. The information manager application 236 may add one or more components to the status bar widget 241, such that selection of a component may cause account information 243 to be provided to the currently executing client application 239. Next, a general description of the operation of the various components of the networked environment 200 will be provided with reference to several example user interfaces 242.

Referring next to FIGS. 3A-3F, shown are example user interfaces 242 rendered by the information manager application 236 (FIG. 2) executed in a client 206 in the networked environment 200 (FIG. 2). The information manager application 236 is employed to view and perform management functions on items of information, such as account or sign-in information, and to provide the account information to applications. Beginning with FIG. 3A, the user interface 242a on the display 233 corresponds to an initial log-in screen of the information manager application 236 that may be shown when the information manager application 236 is initially loaded, or if a user explicitly logs out of, or otherwise resets the state of, the information manager application 236. In the user interface 242a, the user is requested to provide various security credentials 221 (FIG. 2). Specifically, in this example, the user interface 242a includes an input field 303 requesting an e-mail address (or username) and an input field 306 requesting a password. Here, the user has entered the e-mail address "alice@example.com" and a password that is represented for security purposes by asterisks. Once the user provides the requested security credentials 221, the user may select the button 309 to trigger generation of a stored data request 218 (FIG. 2) with the provided security credentials 221.

Figure 3A:
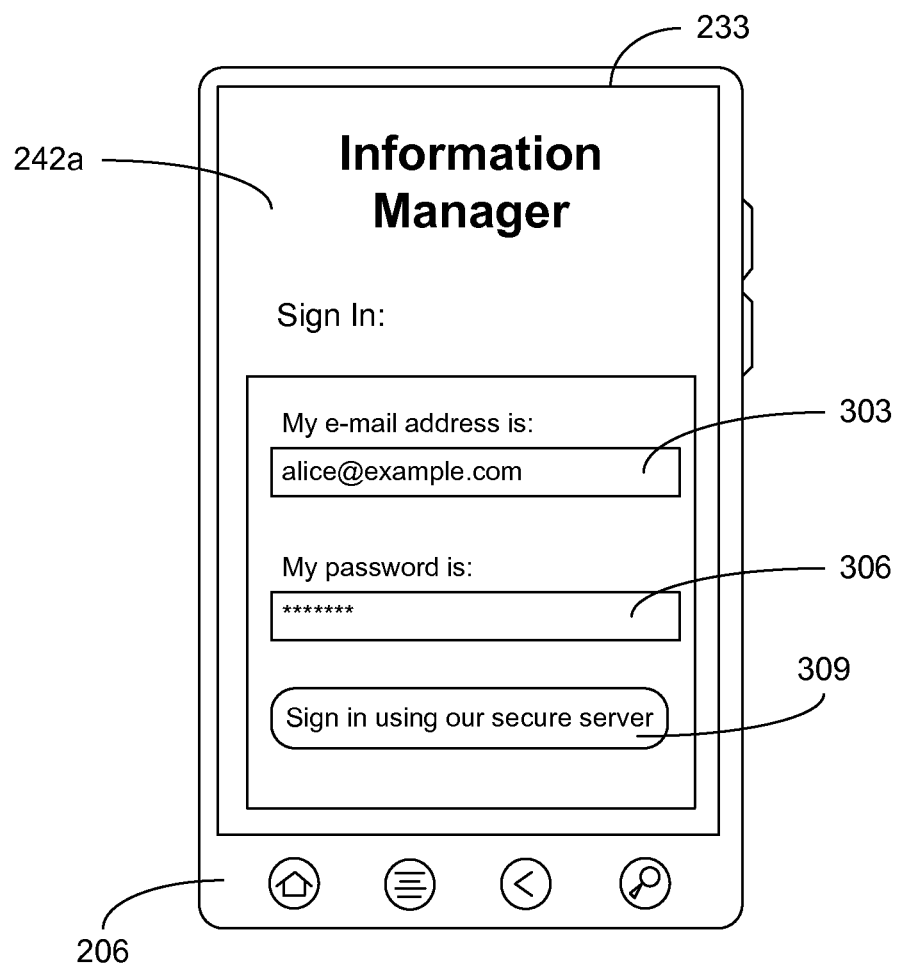
FIGS. 3A-3F are pictorial diagrams of example user interfaces rendered by a client in the networked environment of FIG. 2 according to various embodiments of the present disclosure.
Figure 3B:
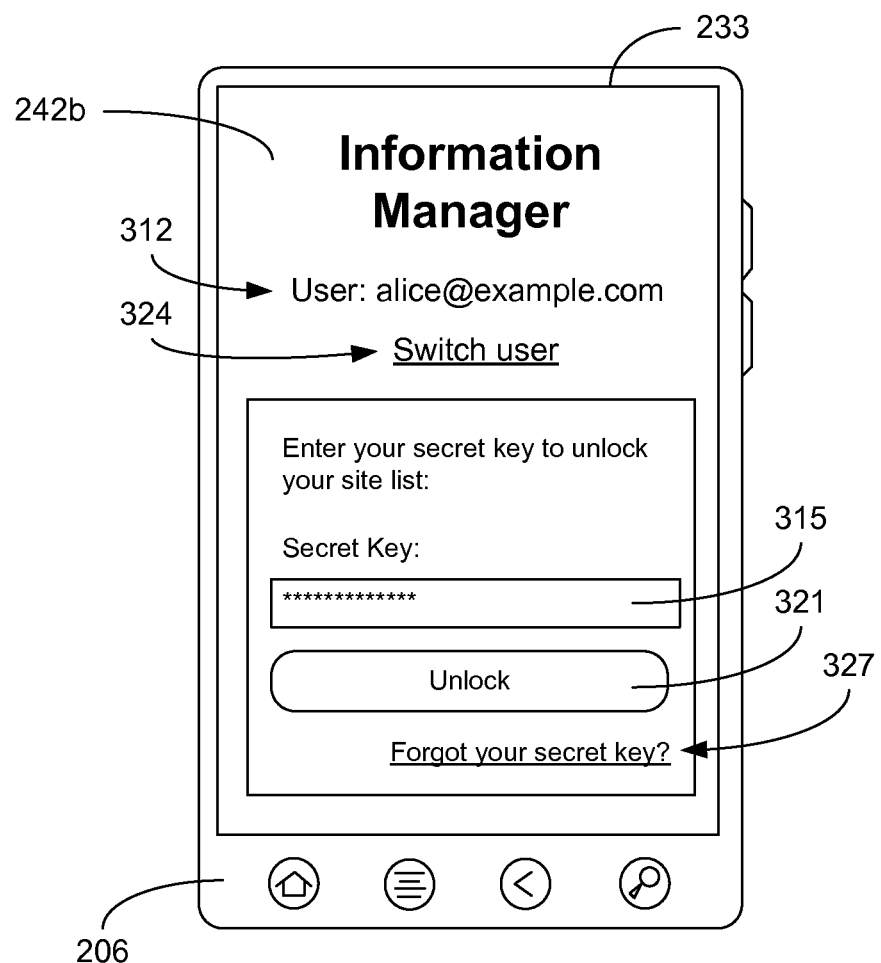

In FIG. 3B, the user interface 242b corresponds to a subsequent execution of the information manager application 236 relative to FIG. 2A. Here, an indication 312 is shown that the username is recognized to be "alice@example.com," as was previously provided in the input field 303 in the example of FIG. 3A. In this example, a form field 315 is shown for the user to provide a security credential 221 such as a secret key, unlock code, personal identification number (PIN), password, or other security credential 221. In some cases, the information manager application 236 may utilize face-based unlock or other form of biometric recognition. Once the user provides the requested security credentials 221, the user may select the button 321 to trigger generation of a stored data request 218 (FIG. 2) with the provided and/or stored security credentials 221.

To accommodate multiple users, a component 324 may be provided to allow for switching of the current user. That is, upon selection of the component 324, the information manager application 236 may "forget" the recognized username of "alice@example.com" and revert back to rendering the user interface 242a of FIG. 3A. The information manager application 236 may erase tokens and/or other status information for the previously logged-in user. The user may then provide a different username and log in as a different user via the user interface 242a. In some cases, a component may be provided for allowing multiple users to be logged in simultaneously.

In one scenario, the user may not remember the security credential 221 that is being requested. In such a situation, the user may select the component 327, which is labeled "Forgot your secret key?" Upon selection of the component 327, another user interface 242 may be rendered to allow for recovery of the security credential 221. For example, recovery may comprise a reset token to be sent to an email address, telephone number, or other preconfigured channel of communication for the user. Other recovery approaches may be employed such as a universal serial bus (USB) fob, operating system-based access, one-time passwords, and so on. Further, the user may be asked to answer one or more knowledge-based questions to help establish identity before the security credential 221 reset is initiated. In one embodiment, selection of the component 327 may load a help screen that reminds the user what the requested security credential 221 is, for example, credential creation criteria (e.g., number of characters, acceptable characters, etc.) and when the requested security credential 221 is to be entered.

In one embodiment, the account through which the user logs into the information manager application 236 may be an account with an identity provider. In some cases, the user may need to further configure the account to support the information manager application 236. In such cases, the information manager application 236 may be configured to instruct the user to visit a certain network page address to complete initial set-up.

Upon providing the correct security credential 221, the information manager application 236 authenticates with the network data server 215 and obtains the encrypted account information 224. Alternatively, if the account information 243 is cached in the client 206, the information manager application 236 may enable access to the account information 243 in response to the correct security credential 221 being provided. Although the user interfaces 242a and 242b of FIGS. 3A and 3B are shown as associated with a specific information manager application 236, in some embodiments, the functionality of the information manager application 236 may be integrated within the operating system 240 (FIG. 2). In such embodiments, the user interfaces 242a and 242b of FIGS. 3A and 3B may correspond to a log-in screen or unlock screen for the operating system 240.

Figure 3C:
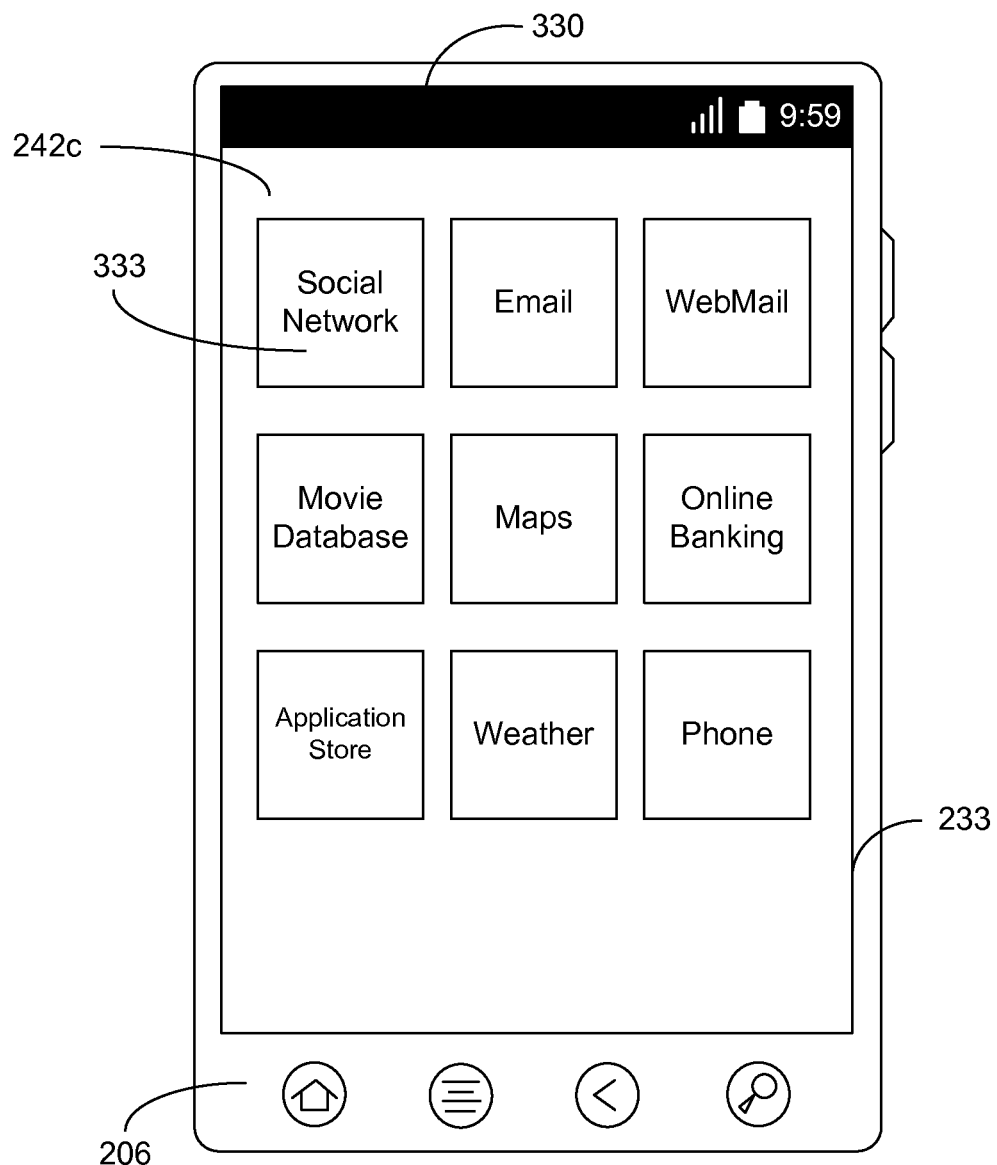

Continuing to FIG. 3C, shown is one example of an application launcher user interface 242c rendered upon a display 233 by an information manager application 236 (FIG. 2) (or operating system 240 (FIG. 2)) executed in a client 206 in the networked environment 200 (FIG. 2) according to various embodiments. Also rendered upon the display 233 is a status bar 330 that is rendered by a status bar widget 241 (FIG. 2) executed in the client 206. The application launcher user interface 242c includes a plurality of selectable indicia 333 that each correspond to a client application 239 (FIG. 2). The selectable indicia 333 may comprise, for example, icons, buttons, text labels, etc.

When a user selects one of the selectable indicia 333, the information manager application 236 (or operating system 240) launches the corresponding client application 239. In addition, the information manager application 236 may provide the stored account information 243 (FIG. 2) corresponding to one or more accounts to the launched instance of the client application 239. This may be done automatically (via inter-process communication, form filling, command-line arguments, etc.) or manually (via copying the stored account information 243 to the device clipboard, etc.).

The type of user selection may result in different behavior. For example, a long press of the selectable indicia 333 may result in rendering a pop-over dialog enabling the user to select a particular account other than the default. By contrast, a touch (rather than a long press) may cause a default account associated with the client application 239 to be selected. The type of user selection may determine the type of stored account information 243 that is provided (e.g., sign-in information, payment information, contact information, etc.).

A verification procedure may be performed on the client application 239 before stored account information 243 is provided, or even before a runtime association between the client application 239 and the stored account information 243 is created. Such a procedure may be desirable if the application includes dynamically loaded code that may change over time. Techniques for performing such verifications are disclosed in U.S. patent application Ser. No. 14/012,520, entitled "DYNAMIC APPLICATION SECURITY VERIFICATION," and filed Aug. 28, 2013, which is incorporated herein by reference in its entirety.

Figure 3D:
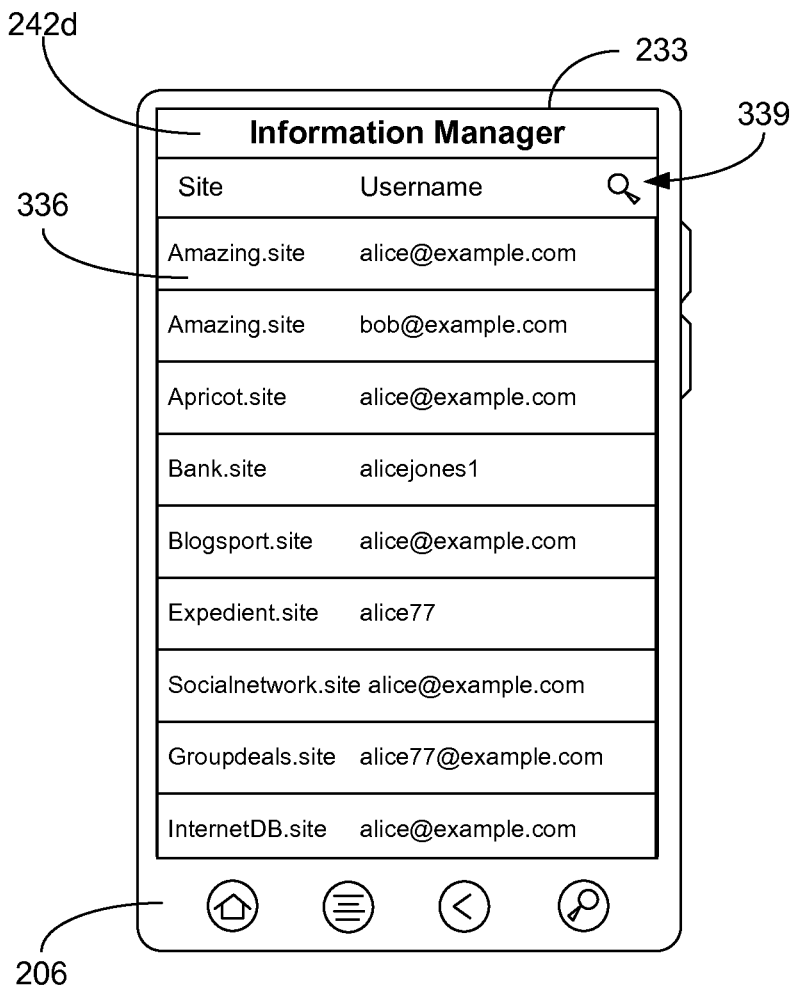

FIG. 3D shows an example user interface 242d that may be rendered by the information manager application 236 using the account information 243 (FIG. 2). The user interface 242d, in this example, comprises a tabular interface including multiple rows 336, which are selectable components. In other embodiments, the selectable components may comprise buttons, links, or other graphical user interface components. One of the rows 336 may be user selected by way of a gesture via a touchscreen display 233. Such a gesture may comprise a tap, a swipe, a multi-touch gesture, or other gesture. The user interface 242d may be scrolled by way of a swipe or other gesture to reveal additional rows 336 or additional information for a row 336. A search component 339 may be provided to facilitate searching or filtering of the rows 336 by search criteria.

Each of the rows 336 corresponds to a particular account or other data item in the account information 243. Each of the rows 336 renders certain information regarding the respective account or data item. In this example, each of the rows 336 presents a network site name (e.g., "Amazing.site") and a username (e.g., "alice@example.com"). It is noted that the rows 336 do not present the passwords or other security credentials 221 (FIG. 1) for the accounts. In other examples, the passwords or other security credentials 221 may be presented. In other examples, more or less information may be shown for each row 336. Although the data in the rows 336 is shown here to be text strings, other types of data such as images or other binary data may be employed in other examples. In this non-limiting example, the rows 336 are ranked alphabetically by the network site name. In other examples, the rows 336 may be ranked alphabetically by other data fields, by date added, by last use, and/or by other ranking criteria. Although FIG. 3D shows account-specific information organized in the rows 336, in some embodiments, the information may be shared among multiple accounts (e.g., a single payment instrument associated with multiple accounts), and managed through a single action.

Figure 3E:
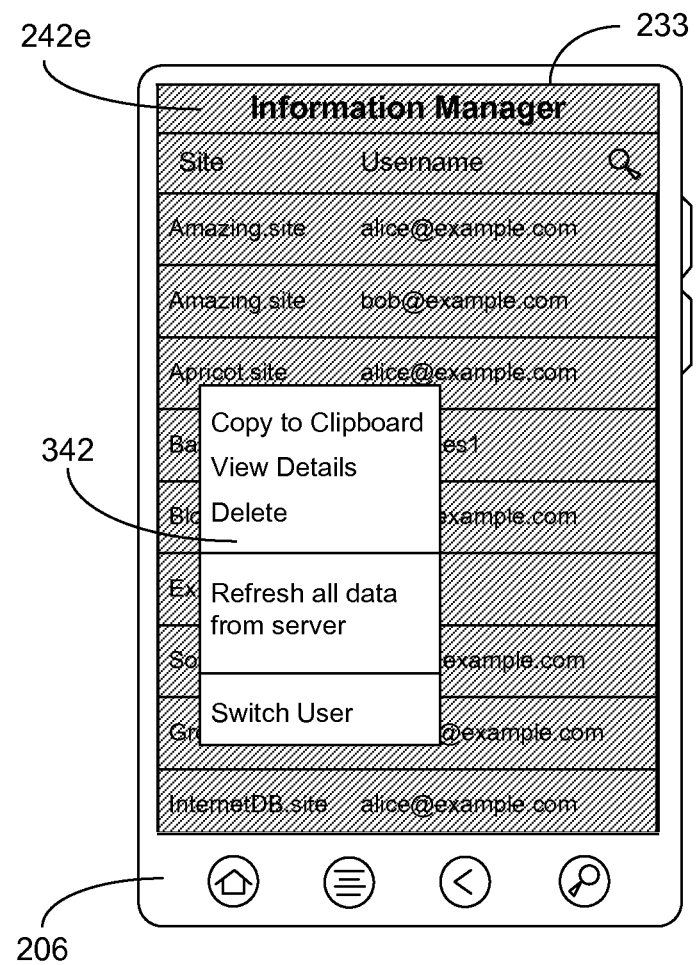

FIG. 3E shows an example user interface 242e rendered upon user selection of a particular row 336 in the user interface 242d of FIG. 3D. In contrast to FIG. 3D, the user interface 242e may be launched in response to an alternative gesture, e.g., tap and hold in lieu of a tap and release. The user interface 242e includes a menu 342 with alternative predetermined actions that may be performed upon the selected row 336. In this non-limiting example, three actions relative to the selected row 336 are shown in the menu 342: "Copy to Clipboard," "View Details," and "Delete." These actions are merely meant as examples, and additional or fewer actions may be offered in other embodiments.

"Copy to Clipboard," when selected, copies the password and/or other data for the selected row 336 to the clipboard. "View Details," when selected, displays all stored information for the selected row 336. "Delete," when selected, may display a confirmation experience. If confirmed, the information manager application 236 would then synchronize with the network data server 215 (FIG. 2) to effect the deletion. In one embodiment, if any synchronization action conflicts, the deletion fails, and the user may be instructed to refresh the data before attempting the deletion again.

Additionally, the menu 342 may include an option to "Refresh all data from server," which, when selected, causes the information manager application 236 to send another stored data request 218 (FIG. 2) to copy the encrypted account information 224 (FIG. 2) again to the client 206. The menu 342 may offer a "Switch User" option that, when selected, renders a user interface 242a (FIG. 3A) that allows another user to log in. Compared with the user interface 242a, the "Switch User" experience may also include an indication of the current user who is logged in as well as a cancel ("stay logged in") option. In one embodiment, tapping anywhere outside of the menu 342 would return the display 233 to the user interface 242d of FIG. 3D. Also, a "Cancel" option could be provided within the menu 342.

Figure 3F:
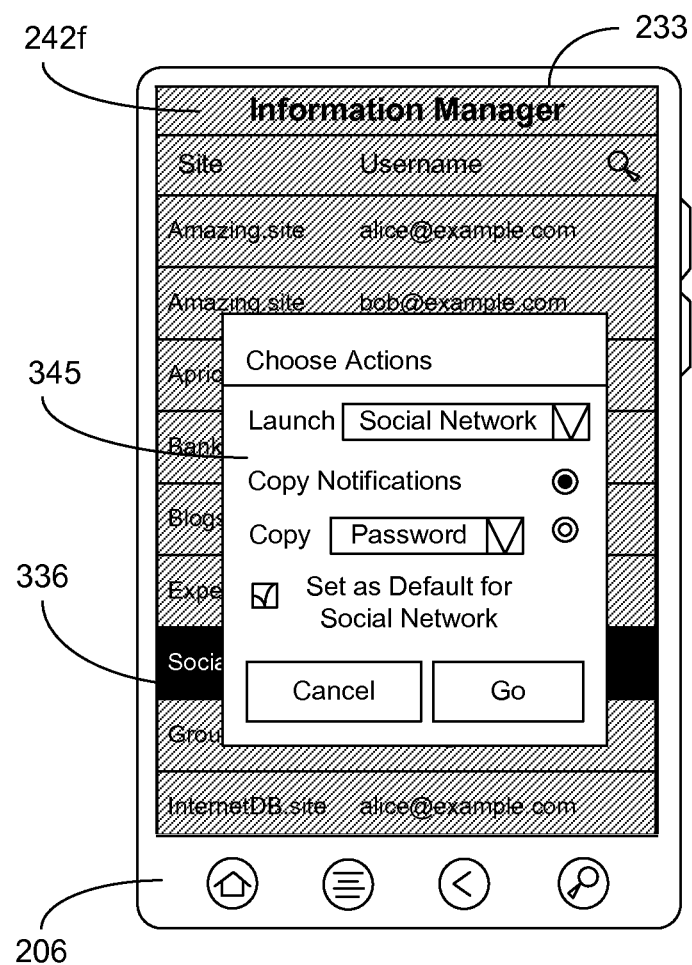

Turning now to FIG. 3F, shown is an example user interface 242f rendered upon user selection of a particular row 336 in the user interface 242d of FIG. 3D. The user interface 242f includes a menu 345. The menu 345 facilitates generating a persistent association between a particular account corresponding to the row 336 and a client application 239 (FIG. 2). For example, the menu 345 includes a drop-down box indicating that the client application 239 called "Social Network" should be launched. In addition, a checkbox enables the particular account to be set as a default for the "Social Network" client application 239. A copy notifications option may enable a status bar widget 241 (FIG. 2) to be configured as in FIG. 1 for the "Social Network" client application 239. Further, a drop-down box or other component may enable selection of particular account information 243 (FIG. 2) to be transferred to the client application 239 (e.g., "Password" in this case). In some cases, the persistent association may identify a specific entry point in the client application 239 where particular account information is to be provided.

Figure 4:
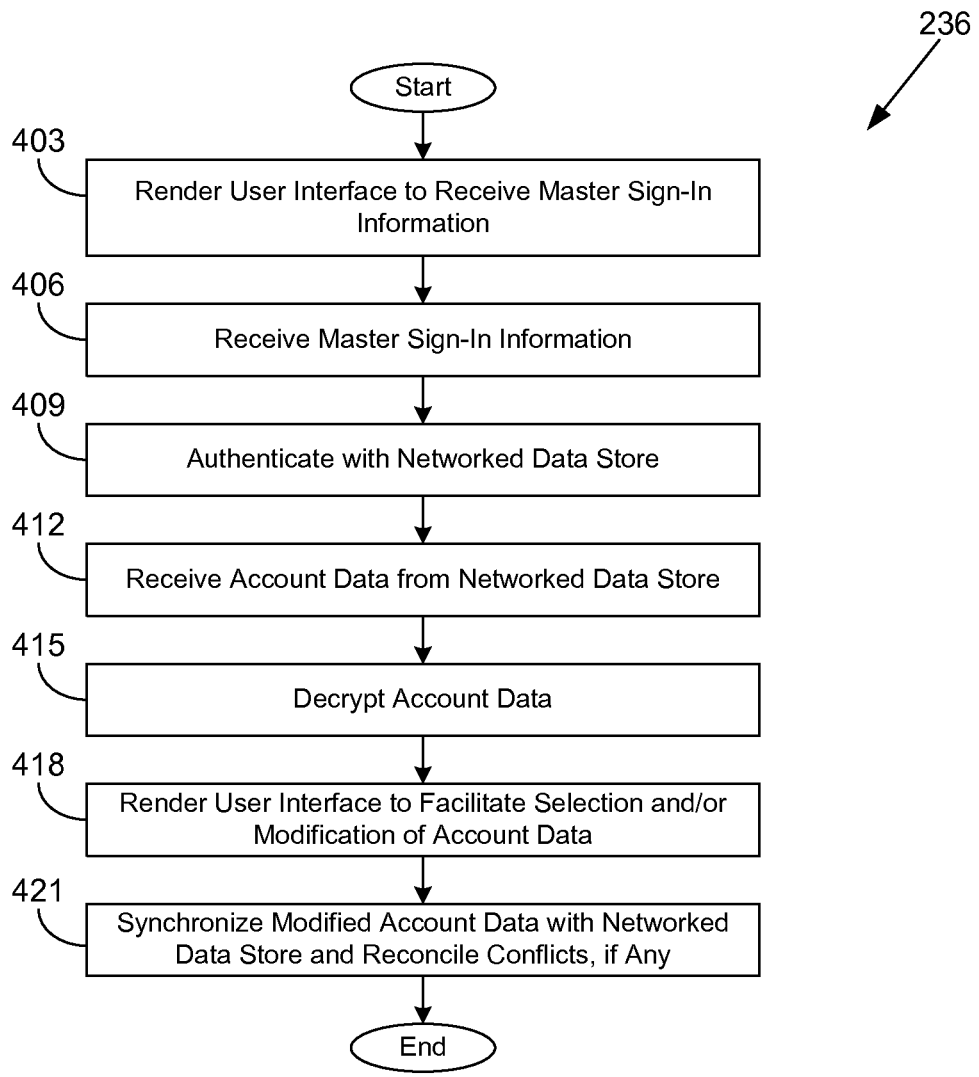
FIGS. 4 and 5 are flowcharts illustrating examples of functionality implemented as portions of an information manager application executed in a client in the networked environment of FIG. 2 according to various embodiments of the present disclosure.

Moving now to FIG. 4, shown is a flowchart that provides one example of the operation of a portion of the information manager application 236 according to various embodiments. It is understood that the flowchart of FIG. 4 provides merely an example of the many different types of functional arrangements that may be employed to implement the operation of the portion of the information manager application 236 as described herein. As an alternative, the flowchart of FIG. 4 may be viewed as depicting an example of elements of a method implemented in the client 206 (FIG. 2) according to one or more embodiments.

Beginning with box 403, the information manager application 236 renders a user interface 242 (FIG. 2) to receive master sign-in information. In box 406, the information manager application 236 receives the master sign-in information from the user. In various embodiments, this may involve the user supplying a master username and/or password, a numerical code, providing a voice sample, providing a fingerprint or other biometric identifier, using a stored key, providing an OAuth token, and/or providing other forms of sign-in information. In some cases, the master sign-in information may be previously stored by the client 206. The information manager application 236 may authenticate the user based upon the provided master sign-in information and fail authentication if the master sign-in information is not validated. In box 409, the information manager application 236 authenticates with a remote, networked data store corresponding to the network data server 215 (FIG. 2) using the master sign-in information. For example, the information manager application 236 may send a stored data request 218 (FIG. 2) containing one or more security credentials 221 (FIG. 2) that correspond to at least a portion of the master sign-in information.

In box 412, the information manager application 236 receives encrypted account information 224 (FIG. 2) from the network data server 215 via the network 209 (FIG. 2). In some embodiments, the information manager application 236 may instead load the account information 243 (FIG. 2) from data storage local to the client 206. In box 415, the information manager application 236 decrypts the encrypted account information 224 using the master sign-in information or another key stored by the client 206. In box 418, the information manager application 236 renders a user interface 242 to facilitate selection and/or modification of account information 243. The account information 243 may relate to a plurality of accounts with a plurality of different network sites. The selected account information 243 may be automatically copied to the device clipboard, automatically provided to a client application 239 (FIG. 2) via an inter-process communication approach, automatically provided to a client application 239 via a form-filling approach, or used in another manner. Where an inter-process communication approach is used, the selected account information 243 may be provided to the client application 239 via push or pull approach. The inter-process communication may involve copying information from one process space to another. In some cases, the selected account information 243 may be mapped to parameters consumed by the client application 239 using metadata according to techniques disclosed by U.S. patent application Ser. No. 13/679,254, entitled "MAPPING STORED CLIENT DATA TO REQUESTED DATA USING METADATA," and filed on Nov. 16, 2012, which is incorporated herein by reference in its entirety.

In box 421, the information manager application 236 synchronizes any modified account information 243 with the network data server 215, which may then proceed to update the stored account information 227 (FIG. 2) in the data store 212 (FIG. 2). The network data server 215 and/or the information manager application 236 may reconcile conflicts in the modified account information 243, if such conflicts exist. Subsequently, the portion of the information manager application 236 ends.

Figure 5:
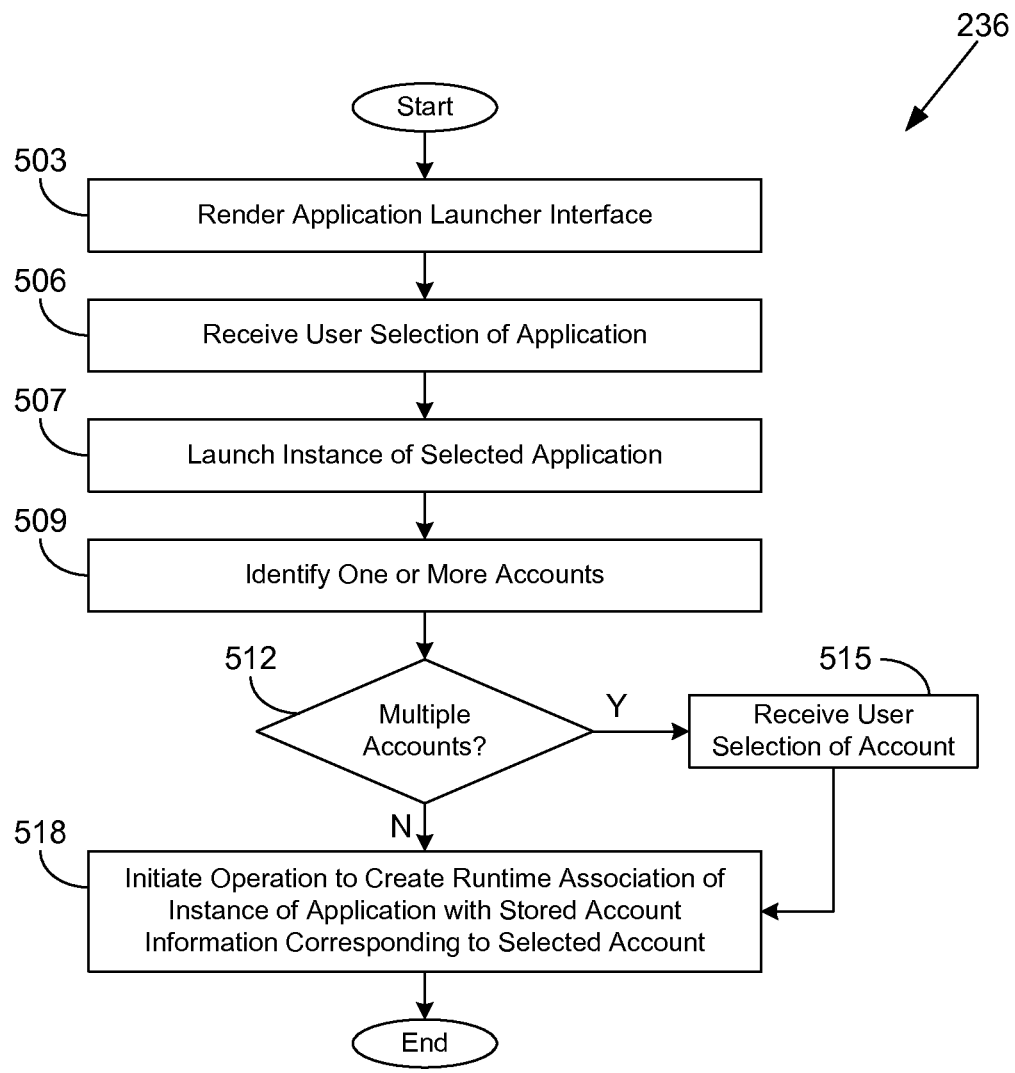

Referring next to FIG. 5, shown is a flowchart that provides one example of the operation of a portion of the information manager application 236 according to various embodiments. Specifically, FIG. 5 pertains to the information manager application 236 being configured as an application launcher. It is understood that the flowchart of FIG. 5 provides merely an example of the many different types of functional arrangements that may be employed to implement the operation of the portion of the information manager application 236 as described herein. As an alternative, the flowchart of FIG. 5 may be viewed as depicting an example of elements of a method implemented in the client 206 (FIG. 2) according to one or more embodiments.

Beginning with box 503, the information manager application 236 renders an application launcher user interface 242c (FIG. 3C). In some cases, the user interface 242 may be rendered by the operating system 240 (FIG. 2), where the information manager application 236 is to some degree integrated with the operating system 240. The user interface 242 includes a plurality of selectable indicia 333 (FIG. 3C) (e.g., icons, buttons, text labels, etc.), which each correspond to a client application 239 (FIG. 2). In box 506, the information manager application 236 receives a user selection of a client application 239 via one or more selectable indicia 333. In box 507, the information manager application 236 launches the selected client application 239.

In box 509, the information manager application 236 identifies one or more accounts corresponding to the selected client application 239 from the account information 243 (FIG. 2). In box 512, the information manager application 236 determines whether multiple accounts are found. If multiple accounts are found, the information manager application 236 may receive a user selection of an account in box 515. Alternatively, the information manager application 236 may automatically select one of the multiple accounts via one or more selection rules. In some cases, a default account may be selected. The information manager application 236 continues to box 518. If multiple accounts are not found, the information manager application 236 also continues to box 518.

In box 518, the information manager application 236 initiates one or more operations to create a runtime association between the instance of the client application 239 and the stored account information 243 corresponding to the selected account. For example, the information manager application 236 may provide the particular stored account information 243 to the client application 239 via inter-process communication, via command-line arguments, form-filling, or another approach. In some cases, the information manager application 236 may provide the stored account information 243 by automatically copying the particular stored account information 243 to the device clipboard, for the user to paste into a form manually.

The particular stored account information 243 may include sign-in information, payment information, contact information, or other information. The association may be a runtime association rather than a persistent association for security reasons. In some embodiments, rather than identifying a particular account and then identifying the particular stored account information 245, the particular stored account information 245 may be identified directly prior to box 518. In some cases, particular stored account information 245 may be associated with multiple accounts. Thereafter, the portion of the information manager application 236 ends.

Figure 6:
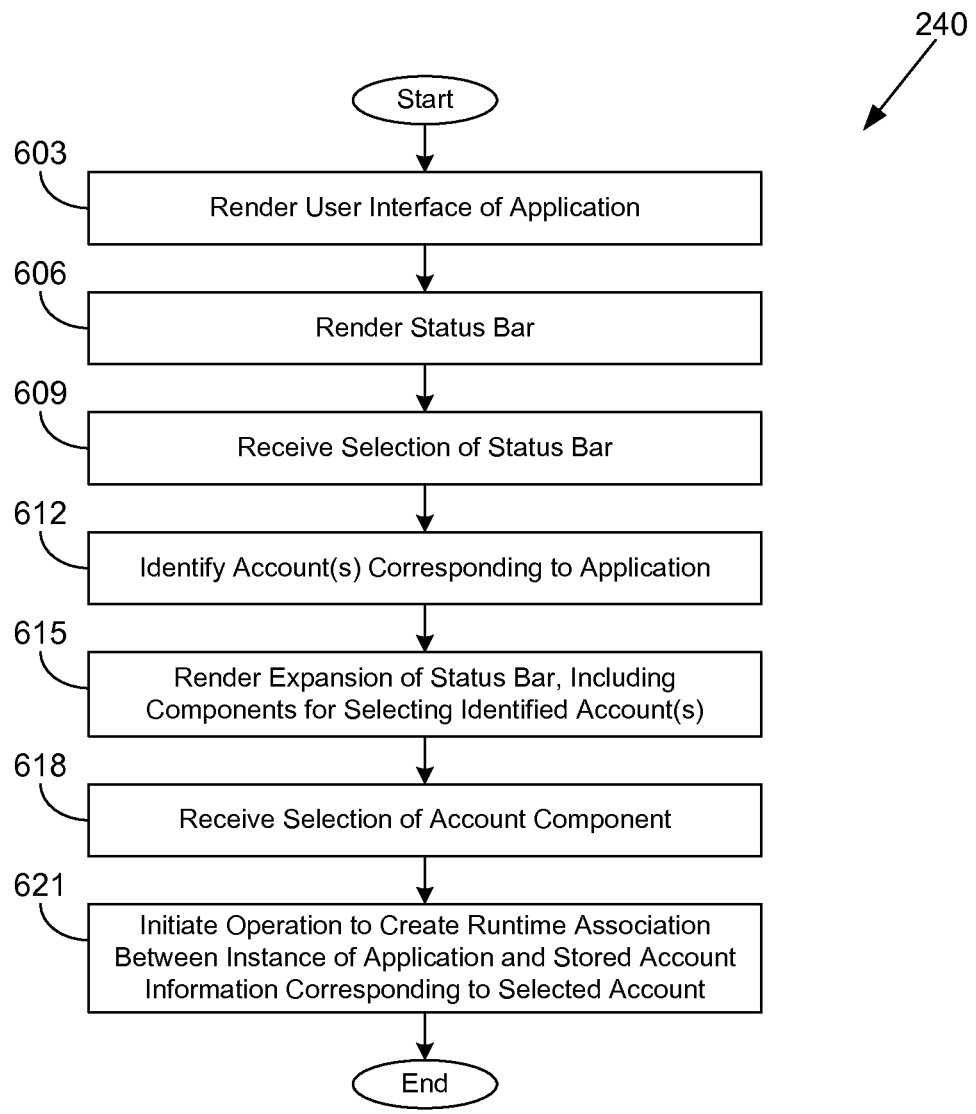
FIG. 6 is a flowchart illustrating one example of functionality implemented as portions of an operating system executed in a client in the networked environment of FIG. 2 according to various embodiments of the present disclosure.

Continuing on to FIG. 6, shown is a flowchart that provides one example of the operation of a portion of the operating system 240 (FIG. 2) according to various embodiments. Specifically, the operating system 240 is configured to integrate the account selection function of the information manager application 236 with a status bar widget 241 (FIG. 2) or other widget. It is understood that the flowchart of FIG. 6 provides merely an example of the many different types of functional arrangements that may be employed to implement the operation of the portion of the operating system 240 as described herein. As an alternative, the flowchart of FIG. 6 may be viewed as depicting an example of elements of a method implemented in the client 206 (FIG. 2) according to one or more embodiments.

Beginning with box 603, the operating system 240 renders a user interface 242 (FIG. 2) of a client application 239 (FIG. 2) upon the display 233 (FIG. 2). In box 606, the operating system 240 renders a status bar upon the display 233. In various examples, the status bar may display time, battery level, network status, notifications, and/or other indicia. In box 609, the operating system 240 receives a user selection of the status bar. In box 612, the operating system 240 uses the information manager application 236 to identify one or more accounts in the account information 243 (FIG. 2) corresponding to the client application 239 for which the user interface 242 is rendered upon the display 233. In some cases, the account may correspond to a default account.

In box 615, the operating system 240 renders an expansion of the status bar upon the display 233, including selectable components configured to facilitate selection of the identified accounts. In box 618, the operating system 240 receives a selection of a component corresponding to an identified account. In box 621, the operating system 240 initiates one or more operations to create a runtime association between the instance of the client application 239 and the stored account information 243 corresponding to the selected account. For example, the operating system 240 may provide the particular stored account information 243 to the client application 239 via inter-process communication, via command-line arguments, form-filling, or another approach. In some cases, the operating system 240 may provide the stored account information 243 by automatically copying the particular stored account information 243 to the device clipboard, for the user to paste into a form manually. The association may be a runtime association rather than a persistent association for security reasons. Thereafter, the portion of the operating system 240 ends.

Figure 7:
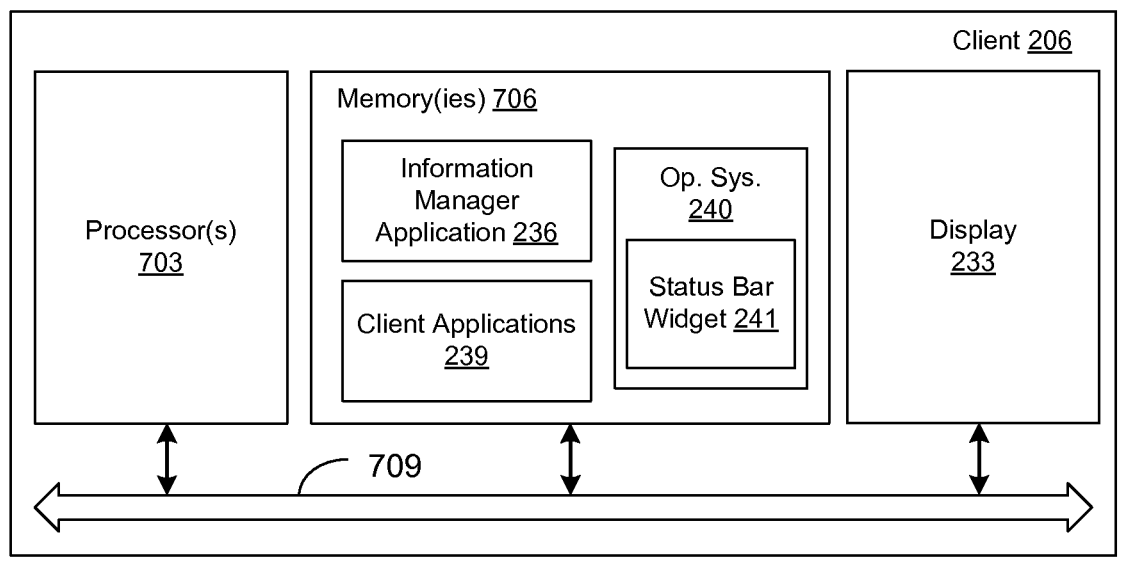
FIG. 7 is a schematic block diagram that provides one example illustration of a client employed in the networked environment of FIG. 2 according to various embodiments of the present disclosure.

With reference to FIG. 7, shown is a schematic block diagram of the client 206 according to an embodiment of the present disclosure. The client 206 corresponds to a computing device that includes at least one processor circuit, for example, having a processor 703 and a memory 706, both of which are coupled to a local interface 709. To this end, the client 206 may comprise, for example, at least one client computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the information manager application 236, the client applications 239, the operating system 240, the status bar widget 241, and potentially other applications and systems. Also stored in the memory 706 may be a data store containing account information 243 (FIG. 2) and other data.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the information manager application 236, the client applications 239, the operating system 240, the status bar widget 241, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the information manager application 236, the operating system 240, and/or the status bar widget 241. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the information manager application 236, the client applications 239, the operating system 240, and the status bar widget 241, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the information manager application 236, the client applications 239, the operating system 240, and the status bar widget 241, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a client computing device; and
    an information manager executed in the client computing device, wherein the information manager causes the client computing device to at least:
        store respective account information for individual ones of a plurality of accounts;
        render a first user interface that facilitates a first user selection of a particular application from a plurality of applications, the first user selection of the particular application corresponding to a request to launch the particular application;
        select particular account information from a plurality of types of account information associated with a respective account of the plurality of accounts in response to a second user selection via a second user interface that is separate from a third user interface of the particular application, the particular account information being selected according to an elapsed time associated with the second user selection; and
        automatically initiate an operation to create a runtime association between an instance of the particular application and the particular account information.

2. The system of claim 1, wherein the information manager further causes the client computing device to at least:
    render the second user interface that facilitates a user specification of a persistent association between a particular account from the plurality of accounts and the particular application; and
    store the persistent association in a mapping in response to the user specification.

3. The system of claim 1, wherein the first user interface that facilitates the first user selection of the particular application from the plurality of applications includes respective selectable indicia for individual ones of the plurality of applications.

4. The system of claim 1, wherein the information manager further causes the client computing device to at least synchronize the respective account information with a remote data store.

5. The system of claim 1, wherein the information manager further causes the client computing device to at least:
    render the second user interface that facilitates a user specification of master sign-in information; and provide access to create runtime associations between the particular account information and the plurality of applications in response to validating the master sign-in information.

6. The system of claim 1, wherein the particular account information comprises a username and a password.

7. The system of claim 1, wherein identifying the particular account information further comprises determining the particular account information based at least in part on a stored mapping of the plurality of accounts to the plurality of applications.

8. The system of claim 1, wherein identifying the particular account information further comprises determining the particular account information based at least in part on the second user selection from a subset of the plurality of accounts that are associated with the particular application.

9. The system of claim 1, wherein the information manager further causes the client computing device to at least launch the instance of the particular application in response to the first user selection.

10. The system of claim 1, wherein initiating the operation to create the runtime association further comprises sending the particular account information to the instance via inter-process communication.

11. The system of claim 1, wherein initiating the operation to create the runtime association further comprises sending the particular account information to the instance via form filling.

12. A method, comprising:
rendering, via a client computing device, a first user interface of an application, the first user interface including a form configured to receive account information;
rendering, via the client computing device, a second user interface after a first user selection of a status bar of an operating system of the client computing device, the status bar and the second user interface being separate from the application, the second user interface comprising an expansion of the status bar, and the second user interface including a component associated with stored account information;
selecting, via the client computing device, a particular type of the account information according to an elapsed time associated with a second user selection of the component; and
causing, via the client computing device, the stored account information associated with the particular type of the account information to be transferred from a first process space to a second process space of the application in response to the second user selection of the component associated with the stored account information.

13. The method of claim 12, wherein causing the stored account information to be transferred to the application further comprises causing, via the client computing device, the form of the first user interface to be populated with the stored account information.

14. The method of claim 12, further comprising:
receiving, via the client computing device, the stored account information from another computing device, the stored account information corresponding to a plurality of accounts; and
decrypting, via the client computing device, the stored account information.

15. The method of claim 12, further comprising:
receiving, via the client computing device, master sign-in information from a user;
validating, via the client computing device, the master sign-in information; and
wherein the stored account information is transferred to the application in response to validating the master sign-in information.

16. The method of claim 12, further comprising:
identifying, via the client computing device, the application in response to the first user selection of the status bar;
determining, via the client computing device, whether the stored account information exists for the application; and
generating, via the client computing device, the component in the second user interface in response to determining that the stored account information exists for the application.

17. The method of claim 12, further comprising:
determining, via the client computing device, a plurality of accounts associated with the form, wherein the stored account information includes respective account information associated with individual ones of the plurality of accounts; and
wherein the component comprises a plurality of components, individual ones of the plurality of components corresponding to the respective account information associated with the individual ones of the plurality of accounts.

18. A non-transitory computer-readable medium embodying a program executable in a mobile computing device, wherein, when executed, the program causes the mobile computing device to at least:
store respective account information for individual ones of a plurality of accounts;
render a first user interface that facilitates a first user selection of a particular application from a plurality of applications, the first user selection of the particular application corresponding to a request to launch the particular application;
select particular account information from a plurality of types of account information associated with a respective account of the plurality of accounts in response to a second user selection via a second user interface that is separate from a third user interface of the particular application, the particular account information being selected according to an elapsed time associated with the second user selection; and
automatically initiate an operation to create a runtime association between an instance of the particular application and the particular account information.

19. The non-transitory computer-readable medium of claim 18, wherein the first user interface that facilitates the first user selection of the particular application from the plurality of applications includes respective selectable indicia for individual ones of the plurality of applications.

20. The non-transitory computer-readable medium of claim 18, wherein, when executed the program further causes the mobile computing device to at least synchronize the respective account information with a remote data store.

* * * * *